United States Patent
Yang et al.

(10) Patent No.: US 10,126,440 B2
(45) Date of Patent: Nov. 13, 2018

(54) SLOW NEUTRON CONVERSION BODY AND SLOW NEUTRON DETECTOR

(71) Applicants: TSINGHUA UNIVERSITY, Beijing (CN); Nuctech Company Limited, Beijing (CN)

(72) Inventors: Yigang Yang, Beijing (CN); Yuanjing Li, Beijing (CN); Zhujun Fang, Beijing (CN); Yulan Li, Beijing (CN)

(73) Assignees: TSINGHUA UNIVERSITY, Beijing (CN); NUCTECH COMPANY LIMITED, Beijing (CN)

( * ) Notice: Subject to any disclaimer, the term of this patent is extended or adjusted under 35 U.S.C. 154(b) by 296 days.

(21) Appl. No.: 15/280,106

(22) Filed: Sep. 29, 2016

(65) Prior Publication Data

US 2017/0184735 A1     Jun. 29, 2017

(30) Foreign Application Priority Data

Dec. 29, 2015     (CN) .......................... 2015 1 1018954

(51) Int. Cl.
G01F 23/00     (2006.01)
G01T 3/00     (2006.01)

(52) U.S. Cl.
CPC ............... *G01T 3/008* (2013.01); *G01T 3/00* (2013.01)

(58) Field of Classification Search
CPC .......... G01T 1/167; G01T 1/185; G01T 3/00; G21C 17/108; G21Y 2002/201;

(Continued)

(56) References Cited

U.S. PATENT DOCUMENTS

| 5,488,679 A | 1/1996 | Wu |
| 7,002,159 B2 | 2/2006 | Lacy |

(Continued)

FOREIGN PATENT DOCUMENTS

| CN | 202221480 U | 5/2012 |
| CN | 203217086 U | 9/2013 |

(Continued)

OTHER PUBLICATIONS

Uno et al., "Two-dimensional neutron detector with GEM and its application," 2012, Physics Procedia, vol. 26, pp. 142-152.*

(Continued)

*Primary Examiner* — Kiho Kim
(74) *Attorney, Agent, or Firm* — Scully, Scott, Murphy & Presser, P.C.

(57) ABSTRACT

The present application, pertaining to the field of slow neutron detection, relates to a slow neutron converter and a slow neutron detector. The slow neutron converter includes a substrate, the substrate including a plurality of holes extending along a first direction and insulating walls between the plurality of holes, wherein the plurality of holes are through holes. The slow neutron converter further includes a boron layer at least covering an exposed surface of the plurality of holes. The slow neutron converter and the slow neutron detector having the slow neutron converter according to the present disclosure are capable of maintaining a high slow neutron detection efficiency. In addition, the manufacturing complexity and manufacturing cost of the detector are reduced, and thus the effective, convenient and low-cost slow neutron detection is achieved.

18 Claims, 5 Drawing Sheets

(58) Field of Classification Search
CPC ....... G21Y 2002/204; G21Y 2002/301; G21Y 2002/304; G21Y 2004/10; G21Y 2004/30
See application file for complete search history.

(56) References Cited

U.S. PATENT DOCUMENTS

| | | | |
|---|---|---|---|
| 8,334,524 | B2 | 12/2012 | DeMeo et al. |
| 8,975,593 | B1 | 3/2015 | Best et al. |
| 9,281,153 | B1* | 3/2016 | Wedding ............... H01J 47/008 |
| 2006/0023828 | A1* | 2/2006 | McGregor ............. G01T 1/167 |
| | | | 376/158 |
| 2010/0078570 | A1 | 4/2010 | Frank |
| 2010/0258737 | A1 | 10/2010 | McCormick et al. |
| 2011/0042577 | A1 | 2/2011 | Andrews et al. |
| 2012/0217406 | A1 | 8/2012 | McGregor et al. |
| 2012/0223242 | A1 | 9/2012 | Brown et al. |
| 2013/0091763 | A1 | 4/2013 | Rottner et al. |
| 2013/0168565 | A1 | 7/2013 | Yang et al. |
| 2014/0061490 | A1 | 3/2014 | Zhao et al. |
| 2014/0097351 | A1 | 4/2014 | Lacy |
| 2014/0299780 | A1 | 10/2014 | Feller et al. |
| 2015/0060680 | A1* | 3/2015 | Cocks ....................... G01T 3/08 |
| | | | 250/370.05 |
| 2015/0097122 | A1 | 4/2015 | Nakamura et al. |

FOREIGN PATENT DOCUMENTS

| | | | |
|---|---|---|---|
| CN | 103336296 A | 10/2013 | |
| CN | 102565846 B | 5/2014 | |
| CN | 205450297 U | 8/2016 | |
| EP | 2 873 993 A1 | 5/2015 | |
| EP | 2 921 883 A1 | 9/2015 | |
| JP | 8-179045 | 7/1996 | |
| JP | 08271639 A | * 10/1996 | ............ G21K 1/025 |
| JP | 2007-59391 | 3/2007 | |
| JP | 2008-180647 | 8/2008 | |
| JP | 2014-29332 | 2/2014 | |
| RU | 2 386 983 C1 | 4/2010 | |
| WO | WO 2009/142856 A1 | 11/2009 | |
| WO | WO 20151074028 A1 | 5/2015 | |

OTHER PUBLICATIONS

Examination report No. 1 for Standard Patent Application dated Jun. 23, 2017, issued in Australian Patent Application No. 2016234975.
European Search Report dated May 17, 2017, issued in European Application No. 16 19 1729.
Russian Office Action dated May 31, 2017, issued in Russian Application No. 2016141068/28 (in Russian and in English).

* cited by examiner

SLOW NEUTRON CONVERSION BODY AND SLOW NEUTRON DETECTOR

TECHNICAL FIELD

The present disclosure relates to slow neutron detection, and in particular, to a slow neutron converter and a slow neutron detector which contains this slow neutron converter.

BACKGROUND

With the increase of the applications of slow neutron detection and imaging technology in such aspects as homeland security, material monitoring, slow neutron scattering source measurement, the demands on the slow neutron detector are gradually increasing. However, the widely applied $^3$He gas no longer satisfies the constantly increasing use demands, and thus different types of new slow neutron detectors are developed to replace the $^3$He gas detector, including the gas slow neutron detector, the scintillator slow neutron detector, the semiconductor slow neutron detector and the like.

With respect to a slow neutron detector, a slow neutron converter is an important structure therein. Since the slow neutrons themselves carry no charges, except for a few types of slow neutron sensitive nuclide such as $^6$Li, $^{10}$B, Gd and the like, the slow neutrons have a small reaction cross-section with other substances, which causes that the slow neutrons are hard to be directly detected. Inside of the slow neutron converter is rich in a large quantity of slow neutron sensitive nuclide, which can convert the slow neutrons into charged particles through nuclear reactions. The detector may conveniently measure the energy and position information of these charged particles, which obtain relative physical information of the incident slow neutrons.

In design of the gas slow neutron detector, depending on the used basic detector, there may be a plurality of types of slow neutron converters and slow neutron detectors. Such as the gas slow neutron detector based on a cylindrical proportional detector array, and the gas slow neutron detector based on a multiple plate ionization chamber.

In the gas slow neutron detector based on a cylindrical proportional detector array, a most basic slow neutron detection unit is a cylindrical proportional detector, and each unit has an independent anode wire and a signal collection and processing system. A typical example is the "straw tube" slow neutron detector array. However, the slow neutron sensitive area and the slow neutron detection efficiency of the detector are substantially proportional to the square of the quantity of cylindrical proportional detectors. In the system, installation and repair of a large quantity of anode wires would cause a great workload, and the difference in the detection efficiency among various slow neutron detection units would also affect the performance of the entire system.

In the gas slow neutron detector based on a multiple plate ionization chamber, the most basic slow neutron detection unit is a plate ionization chamber, and each ionization chamber has an independent two-dimensional signal readout system. A typical example is the B-GEM slow neutron detector. However, a single-layer plate ionization chamber has a low slow neutron detection efficiency, and thus some methods are needed to be employed to improve the overall slow neutron detection efficiency, such as the multiple chamber stacking, slow neutron incidence with a grazing angle. However, this would cause a great pressure on the overall signal readout and processing, and thus large-area slow neutron detection is inconvenient to be implemented.

Therefore, a new slow neutron converter and a new slow neutron detector are desired.

The above information disclosed in the background portion is only used to reinforce understanding of the background of the present disclosure. Therefore, the above information may include information that is not prior arts known to persons of ordinary skill in the art.

SUMMARY

The present disclosure provides a slow neutron converter and a slow neutron detector, which are capable of maintaining a high slow neutron detection efficiency.

Other characteristics, features, and advantages of the present disclosure will become apparent through the following detailed description, or will be partially learned from practice of the present disclosure.

According to one aspect of the present disclosure, a slow neutron converter is provided. The slow neutron converter includes: a substrate, wherein the substrate includes a plurality of holes extending along the first direction and the insulating walls between the plurality of holes; the boron layer, at least covering the exposed surface of the plurality of holes. The plurality of holes are through holes.

According to some embodiments, each hole has a circular or polygonal cross-section.

According to some embodiments, each hole has a regular polygonal cross-section.

According to some embodiments, each hole has a regular hexagonal cross-section, and the plurality of holes are evenly arranged, such that the slow neutron converter has a honeycomb structure.

According to some According to some embodiments, each hole has an inscribed circle whose diameter is in the range of 0.1 mm to 20 mm.

According to some embodiments, each hole has an inscribed circle whose diameter is in the range of 3 mm to 10 mm. embodiments, the substrate has a height in the range of 1 cm to 30 cm along the first direction.

According to some embodiments, the substrate has a height in the range of 10 cm to 15 cm along the first direction.

According to some embodiments, the boron layer contains $^{nat}$B.

According to some embodiments, the boron layer has a mass thickness in the range of 0.232 to 0.694 mg/cm$^2$.

According to some embodiments, the boron layer has a mass thickness in the range of 0.3 to 0.4 mg/cm$^2$.

According to some embodiments, the boron layer has a mass thickness of 0.37 mg/cm$^2$.

According to some embodiments, the substrate has a cubic or cuboid shape.

According to some embodiments, the insulating walls have a thickness in the range of 1 μm to 50 μm.

According to some embodiments, the insulating walls have a thickness in the range of 5 μm to 20 μm.

According to some embodiments, the insulating walls contain NOMEX paper.

According to another aspect of the present disclosure, a slow neutron detector is provided. The slow neutron detector includes: any slow neutron converter as described above, wherein the plurality of holes are filled with an ionization working gas; a cathode plate, disposed at one end of the slow neutron converter; an electron multiplier, disposed at another end of the slow neutron converter; and an anode plate, disposed opposite to the electron multiplier, an electric field being formed between the cathode plate and the anode plate.

According to some embodiments, the electron multiplier includes the gas electron multiplier (GEM) and the micro mesh gaseous structure chamber (micromegas).

According to some embodiments, the slow neutron detector further includes a field cage which having a cylindrical structure, wherein the field cage surrounds the slow neutron converter.

According to some embodiments, the field cage includes a plurality of coaxial copper rings, the plurality of coaxial copper rings being applied with a gradient voltage respectively.

According to some embodiments, the slow neutron detector further includes protection rings disposed on both sides of the field cage.

The slow neutron converter and the slow neutron detector according to the present disclosure are capable of maintaining a high slow neutron detection efficiency. In addition, according to the technical solutions of the present disclosure, the manufacturing complexity and manufacturing cost of the detector are reduced, and thus the effective, convenient and low-cost slow neutron detection is achieved.

BRIEF DESCRIPTION OF THE DRAWINGS

Exemplary embodiments of the present disclosure will be described in detail with reference to the accompanying drawings, such that the above and other features and advantages will become more apparent.

DETAILED DESCRIPTION

Figure 1:
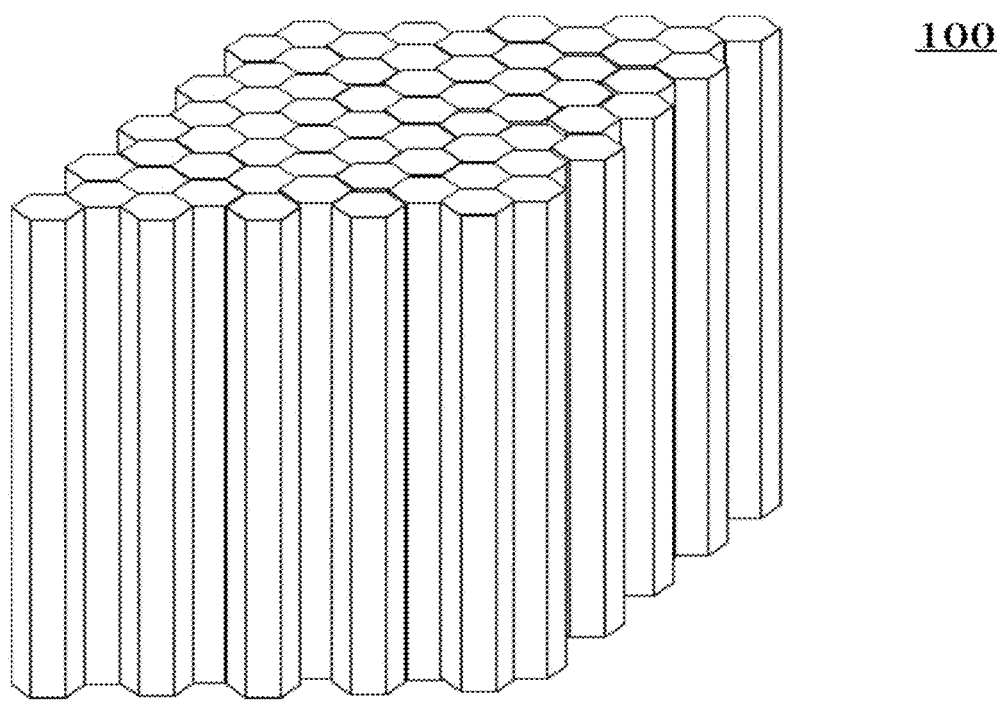
FIG. 1 is a three-dimensional diagram of a slow neutron converter according to the exemplary embodiment of the present disclosure.

Exemplary embodiments of the present disclosure are hereinafter described more fully with reference to the accompany drawings. However, the exemplary embodiments may be implemented in a plurality of manners, and shall not be construed as being limited to the implementations described herein. Instead, such exemplary embodiments are provided to more thoroughly and completely illustrate the present disclosure, and fully convey the concepts of the exemplary embodiments to persons skilled in the art. In the drawings, like reference numerals denote like or similar structures or elements. Therefore, repetitive descriptions thereof are not given any further.

In addition, the described characteristics, structures, or features may be incorporated in one or more embodiments in any suitable manner. In the description hereinafter, more details are provided such that sufficient understanding of the embodiments of the present disclosure may be achieved. However, a person skilled in the art would be aware that the technical solutions of the present disclosure may be practiced without one or more of the specific details, or may be practiced using other methods, components, materials, apparatuses, steps or the like. Under other circumstances, commonly known structures, methods, apparatuses, practices, materials or operations are not illustrated or described in detail to avoid various aspects of the present disclosure from becoming ambiguous.

The present disclosure provides a novel detector, wherein a slow neutron converter is fabricated by using a boron layer structure. The detector implements the functions such as slow neutron absorption, ionization of charged particles, electron drift, and then amplifies signals by using an electron multiplier.

Figure 2:
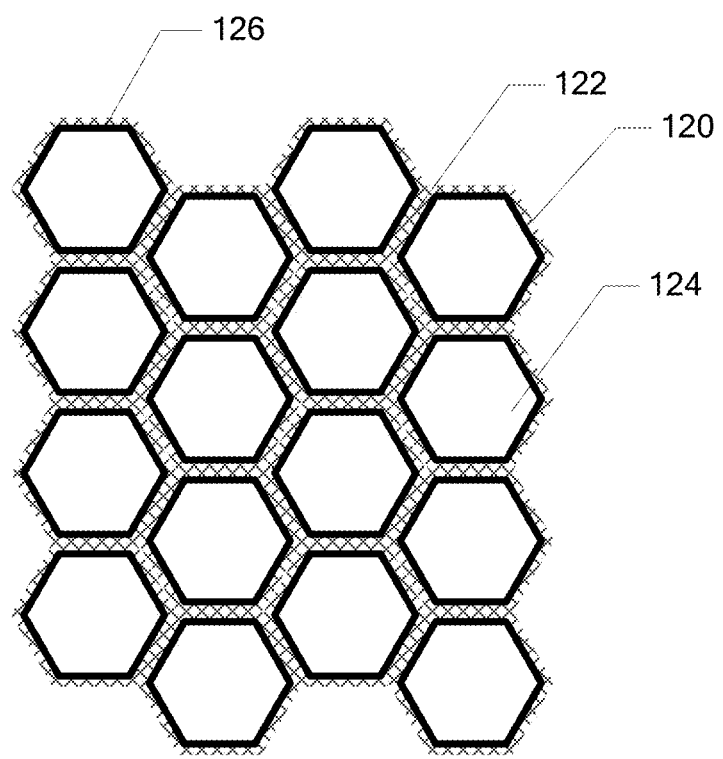
FIG. 2 is a sectional view of the slow neutron converter as illustrated in FIG. 1.

FIG. 1 is a three-dimensional diagram of a slow neutron converter according to an exemplary embodiment of the present disclosure. FIG. 2 is a sectional view of the slow neutron converter as illustrated in FIG. 1. It should be understood that the structure schematically illustrated in FIG. 1 and FIG. 2 is merely an example of the slow neutron converter according to the present disclosure. The present disclosure it not limited thereto.

As illustrated in FIG. 1 and FIG. 2, a slow neutron converter 100 according to the present disclosure may include a substrate 120.

The substrate 120 may include a plurality of holes 124 penetrating through the substrate along a first direction, and insulating walls 122 between the plurality of holes.

Each hole 124 may have a circular or polygonal cross-section. According to some embodiments, each hole has a regular polygonal cross-section. According to some embodiments, each hole has a regular hexagonal cross-section, and the plurality of holes are evenly arranged, such that the slow neutron converter has a honeycomb structure, as illustrated in FIG. 1 and FIG. 2, but the present disclosure is not limited thereto. The holes 124 may be filled with an ionization working gas, which would be described in detail hereinafter.

As illustrated in FIG. 2, the slow neutron converter 100 further includes a boron layer 126 at least covering the exposed surface of the plurality of holes 124. According to some embodiments, the boron layer 126 may be made by means of dip-coating or other suitable manners.

The holes 124 may have a smooth exposed surface, such that the boron layer covering the substrate 120 has better uniformity and surface roughness (for example, a flatness of less than 0.1 μm).

According to the present disclosure, $^{nat}B$ (natural boron) or $^{10}B$ (purified boron) may be used as a material for slow neutron conversion.

According to some embodiments, the substrate 120 has a cubic or cuboid shape. However, the present disclosure sets no limitation to the specific shape.

According to some embodiments, the insulating walls 122 may have a thickness in the range of 1 μm to 50 μm. For example, the insulating walls may have a thickness in the range of 5 μm to 20 μm.

According to some embodiments, the insulating walls 122 contain NOMEX paper.

Figure 3:
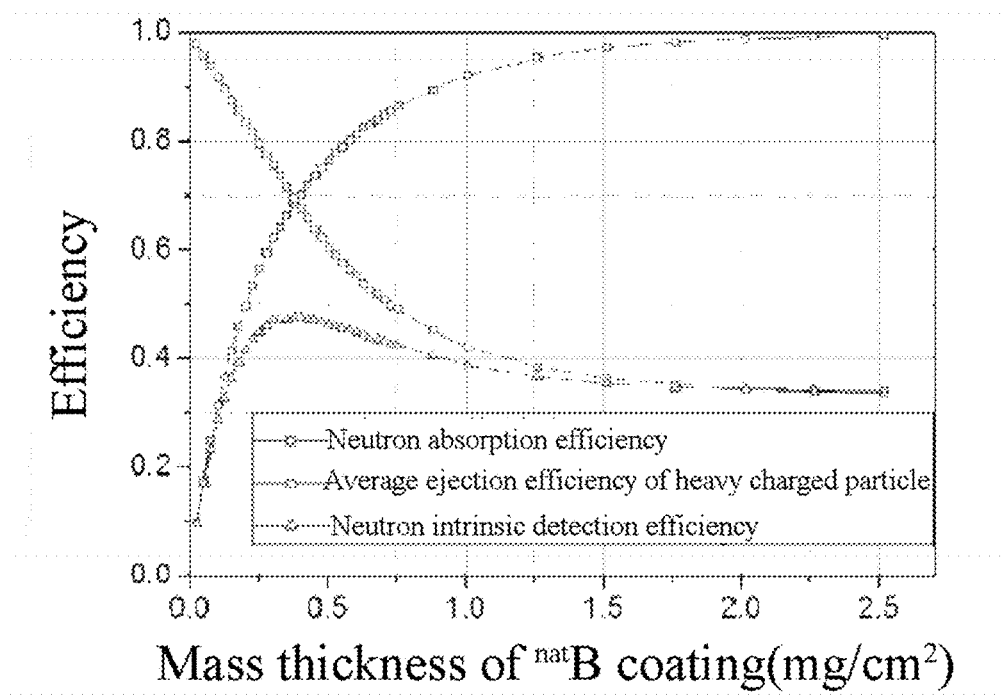
FIG. 3 is a diagram of a relationship between the slow neutron detection efficiency and the mass thickness of a boron layer of the slow neutron converter according to the present disclosure.

FIG. 3 is a curve diagram of a relationship between the slow neutron detection efficiency and the mass thickness of a boron layer of the slow neutron converter according to the present disclosure.

As illustrated in FIG. 3, if $^{nat}B$ is used as a slow neutron conversion material, when a mass thickness of the boron layer is maintained in the range of 0.232 to 0.694 mg/cm$^2$ (the corresponding thickness is 1 to 3 μm when the density is 2.35 g/cm$^3$), a high slow neutron detection efficiency may be achieved.

According to some embodiments, the boron layer has a mass thickness in the range of 0.232 to 0.694 mg/cm$^2$. According to some embodiments, the boron layer has a mass thickness in the range of 0.3 to 0.4 mg/cm$^2$. According to some further embodiments, the boron layer has a mass thickness of 0.37 mg/cm$^2$.

The present inventors have identified that an over-thin boron layer may cause a reduction in the probability of reaction between the boron layer and slow neutrons, whereas an over-thick boron layer may cause that it is hard for heavy charged particles generated by the reaction to enter into the honeycomb holes from the coating of the converter. The both cases may greatly reduce the overall slow neutron detection efficiency.

In addition, the slow neutron converter needs to have a suitable aperture. According to some embodiments, each hole 124 has an inscribed circle whose diameter is in the range of 0.1 mm to 20 mm. According to some embodiments, each hole 124 has an inscribed circle whose diameter is in the range of 3 mm to 10 mm. In the present disclosure, a hole's inscribed circle refers to a circle that is tangent to most number of sides of the hole.

In addition, the slow neutron converter also needs to have a suitable height, so as to achieve both a higher slow neutron detection efficiency and a better electron migration efficiency. According to some embodiments, the substrate 120 has a height in the range of 1 cm to 30 cm. For example, the substrate 120 may have a height in the range of 10 cm to 15 cm.

According to some embodiments, boron powders in the magnitude of nanometers are uniformly deposited on a NOMEX paper substrate to form a honeycomb structure, and then through cutting and shearing, a slow neutron converter satisfying the requirements in terms of aperture, length and boron layer thickness may be obtained.

Figure 4:
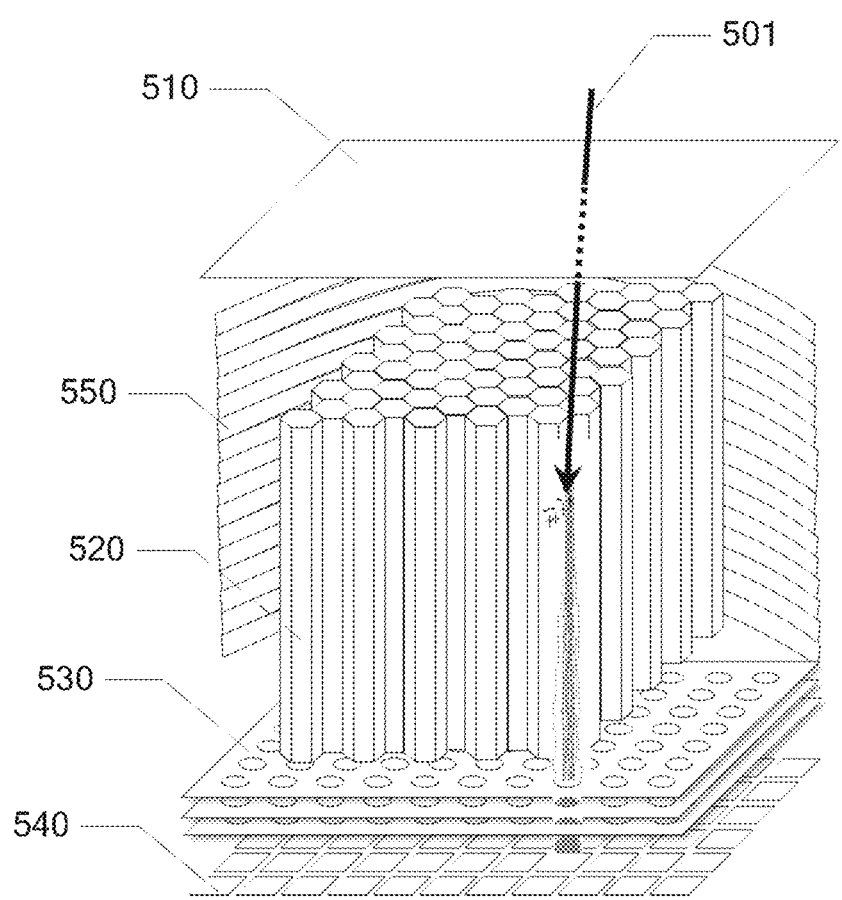
FIG. 4 is a schematic structural diagram of a slow neutron detector according to the exemplary embodiment of the present disclosure.

FIG. 4 schematically illustrates a structural diagram of a slow neutron detector according to an exemplary embodiment of the present disclosure.

As illustrated in FIG. 4, the slow neutron detector 500 may include a slow neutron converter 520. The slow neutron converter 520 may be a slow neutron converter as described above. The slow neutron detector 500 further includes a cathode plate 510 arranged at one end of the slow neutron converter 520, an electron multiplier 530 arranged at the other end of the slow neutron converter 520, and an anode plate 540 arranged opposite to the electron multiplier 530. An electric field is formed between the cathode plate 510 and the anode plate 520, to drive electrons to drift towards the electron multiplier, which will be described hereinafter.

As described above, the slow neutron converter 520 may include the substrate 120 and the boron layer 126. The plurality of holes 124 of the substrate 120 are filled with an ionization working gas, to produce electrons, which will be described hereinafter. A working gas having a small electron transverse diffusion coefficient may be used, such that the electrons are subjected to less transverse diffusion during the migration process. According to some embodiments, the ionization working gas may be a mixed gas having 95% argon gas and 5% carbon dioxide gas. However, the present disclosure sets no limitation to the working gas, which may be any suitable working gas.

According to some embodiments, the electron multiplier 530 may include a gas electron multiplier, a micro mesh gaseous structure chamber and the like. The electron multiplier is capable of multiplying the quantity of electrons passed, thereby ensuring formation of effective electrical signals.

According to some embodiments, as illustrated in FIG. 4, the slow neutron detector 500 may further include a field cage 550 having a cylindrical structure, wherein the field cage 550 surrounds the slow neutron converter. The field cage 550 may include a plurality of coaxial copper rings, wherein the plurality of coaxial copper rings are respectively applied with a gradient voltage. The field cage 550 may achieve an effect of isolation and shielding, and may restrain equipotential surfaces of an internal gas environment to be parallel in most regions, that is, forming an approximate uniform electric field.

In addition, according to some embodiments, the slow neutron detector 500 may further include protection rings (not illustrated). The protection rings may be arranged on both sides of the field cage, and configured to provide electric levels for planes on both ends, thereby achieving assistance to the formation of the uniform electric field.

Figure 5:
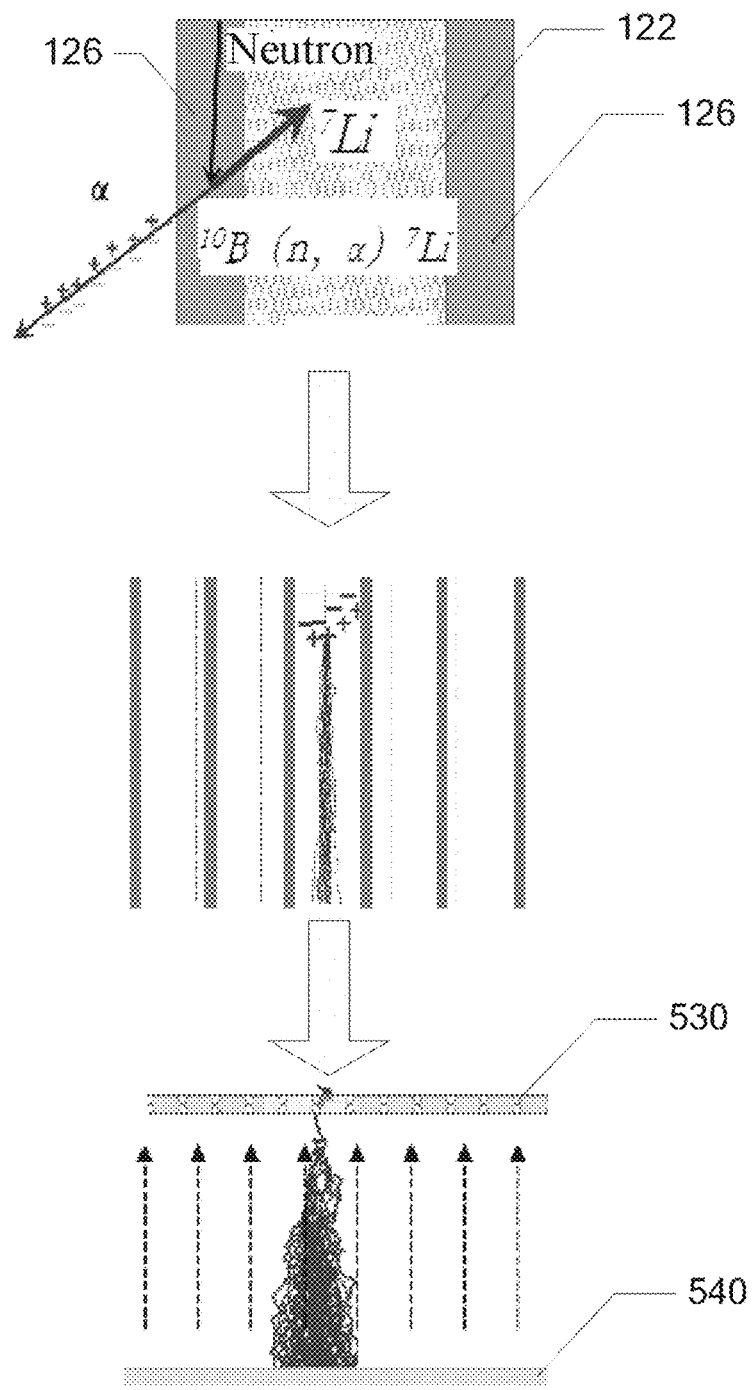
FIG. 5 is a diagram of working principles of the slow neutron detector according to the present disclosure.

FIG. 5 is a diagram illustrating working principles of the slow neutron detector according to the present disclosure. The working principles of the slow neutron detector 500 according to the present disclosure will be described with reference to FIG. 4 and FIG. 5.

As illustrated in FIG. 4 and FIG. 5, the slow neutron detection process according to the present disclosure may be divided into three stages: absorption of slow neutrons to formation of electrons, migration of electrons, multiplication of electrons and signal collection.

A physical process at the stage from absorption of slow neutrons to formation of electrons takes place inside the slow neutron converter. Incident slow neutrons 501 are subjected to a $^{10}$B (n, α) $^7$Li reaction in the boron layer 126, and heavy charged particles α and $^7$Li are produced, the movement directions of which are inverse to each other, and which are evenly distributed within a 4π solid angle. Therefore, in each reaction, at most one particle will enter the gas environment of the honeycomb holes 124. When the α particles or $^7$Li particles move into the gas environment inside the holes, energy may be deposited by means of the ionization effect, and thus electrons are produced. If these electrons are detected by a detector, corresponding electrical signals may be formed.

At this stage, the possible slow neutron detection efficiency of the entire detector is determined by both the probability of slow neutrons subjected to the $^{10}$B (n, α) $^7$Li reaction when the slow neutrons penetrate through the boron layer 126 and the average probability that the α particles or $^7$Li particles enter the holes 124. As described above with reference to FIG. 3, when the boron layer has a mass thickness in the range of 0.232 to 0.694 mg/cm$^2$ (the corresponding thickness is 1 to 3 μm when the density is 2.35 g/cm$^3$), a high slow neutron detection efficiency may be achieved.

Due to the ionization effect of the heavy charged particles, initial positions of the produced electrons are distributed inside various honeycomb holes of the entire slow neutron converter. To make these electrons to form output electrical signals, the technical solution according to the present disclosure causes the electrons to migrate out of the holes. As described above, under the electric field, the electrons are driven to drift towards one end of the slow neutron converter, that is, drift towards the electron multiplier 530.

The electron multiplier 530 is capable of multiplying the quantity of electrons passed, thereby ensuring formation of effective electrical signals. A gas electron multiplier (GEM), a micro mesh gaseous structure chamber (micromegas) or other electron multiplier may all cooperate with the slow neutron converter having the boron layer to normally work.

The electrons are collected by the anode plate 540 and thus electrical signals are formed, which is not described herein any further.

Through the above detailed description, a person skilled in the art will easily understand that the system and method according to the embodiments of the present disclosure have one or more of the following advantages.

By using the slow neutron converter having the boron layer according to the present disclosure, a gas slow neutron detector having a good performance may be manufactured.

While maintaining a high slow neutron detection efficiency, the manufacturing complexity and manufacturing cost of the detector are reduced.

Detailed above are exemplary embodiments of the present disclosure. It shall be understood that the present disclosure is not limited to the above exemplary embodiments. Instead, the present disclosure is intended to cover various modifications and equivalent deployments within the spirit and scope of the appended claims.

The invention claimed is:

1. A slow neutron detector, comprising:
   a slow neutron converter, wherein the slow neutron converter comprises:
      a substrate, comprising: a plurality of holes extending along a first direction, and insulating walls between the plurality of holes; and
      a boron layer, at least covering the exposed surface of the plurality of holes;
      wherein the plurality of holes are through holes and wherein the plurality of holes are filled with an ionization working gas;
   a cathode plate, disposed at one end of the slow neutron converter;
   an electron multiplier, disposed at another end of the slow neutron converter; and
   an anode plate, disposed opposite to the electron multiplier, an electric field being formed between the cathode plate and the anode plate,
   wherein the slow neutron detector further comprises:
   a field cage that surrounds the slow neutron converter; and
   protection rings disposed on both sides of the field cage.

2. The slow neutron detector according to claim 1, wherein the electron multiplier comprises a gas electron multiplier and a micro mesh gaseous chamber.

3. The slow neutron detector according to claim 1, wherein the field cage has a cylindrical structure.

4. The slow neutron detector according to claim 3, wherein the field cage comprises a plurality of coaxial copper rings, the plurality of coaxial copper rings being applied with a gradient voltage respectively.

5. The slow neutron detector according to claim 1, wherein each hole has a circular or polygonal cross-section.

6. The slow neutron detector according to claim 5, wherein each hole has a regular polygonal cross-section.

7. The slow neutron detector according to claim 6, wherein each hole has a regular hexagonal cross-section, and the plurality of holes are evenly arranged, such that the slow neutron converter has a honeycomb structure.

8. The slow neutron detector according to claim 1, wherein each hole has an inscribed circle whose diameter is in the range of 0.1 mm to 20 mm.

9. The slow neutron detector according to claim 8, wherein each hole has an inscribed circle whose diameter is in the range of 3 mm to 10 mm.

10. The slow neutron detector according to claim 1, wherein the substrate has a height in the range of 1 cm to 30 cm along the first direction.

11. The slow neutron detector according to claim 10, wherein the substrate has a height in the range of 10 cm to 15 cm along the first direction.

12. The slow neutron detector according to claim 1, wherein the boron layer contains $^{nat}B$.

13. The slow neutron detector according to claim 12, wherein the boron layer has a mass thickness in the range of 0.232 to 0.694 mg/cm$^2$.

14. The slow neutron detector according to claim 12, wherein the boron layer has a mass thickness in the range of 0.3 to 0.4 mg/cm$^2$.

15. The slow neutron detector according to claim 12, wherein the boron layer has a mass thickness of 0.37 mg/cm$^2$.

16. The slow neutron detector according to claim 1, wherein the substrate has a cubic or cuboid shape.

17. The slow neutron detector according to claim 1, wherein the insulating walls have a thickness in the range of 1 μm to =μm.

18. The slow neutron detector according to claim 1, wherein the insulating walls have a thickness in the range of 5 μm to 20 μm.

* * * * *